United States Patent
Hernandez Abrego et al.

(10) Patent No.: US 7,921,011 B2
(45) Date of Patent: Apr. 5, 2011

(54) STRUCTURE FOR GRAMMAR AND DICTIONARY REPRESENTATION IN VOICE RECOGNITION AND METHOD FOR SIMPLIFYING LINK AND NODE-GENERATED GRAMMARS

(75) Inventors: Gustavo Hernandez Abrego, Foster City, CA (US); Ruxin Chen, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1324 days.

(21) Appl. No.: 11/437,444

(22) Filed: May 19, 2006

(65) Prior Publication Data
US 2006/0277032 A1  Dec. 7, 2006

Related U.S. Application Data

(60) Provisional application No. 60/683,221, filed on May 20, 2005.

(51) Int. Cl.
*G10L 15/04* (2006.01)
*G10L 15/18* (2006.01)
*G06F 17/20* (2006.01)

(52) U.S. Cl. .............. 704/254; 704/257; 704/9
(58) Field of Classification Search ........... 704/251–257
See application file for complete search history.

(56) References Cited

U.S. PATENT DOCUMENTS

| 5,995,918 A * | 11/1999 | Kendall et al. ............. 704/1 |
| 2001/0041978 A1 | 11/2001 | Crespo et al. ............. 704/257 |
| 2002/0032564 A1 | 3/2002 | Ehsani et al. ............. 704/235 |
| 2006/0129396 A1 * | 6/2006 | Ju et al. ............. 704/243 |

FOREIGN PATENT DOCUMENTS
EP  0 854 468 A2  7/1998

OTHER PUBLICATIONS

Siu et al., "*Variable N-Grams and Extensions for Conversational Speech Language Modeling*", IEEE vol. 8, No. 1, Jan. 2000, XP011053989, Service Center, New York, NY, ISSN: 1063-6676, p. 63-75.

* cited by examiner

*Primary Examiner* — Abul Azad
(74) *Attorney, Agent, or Firm* — Martine Penilla & Gencarella, LLP

(57) ABSTRACT

Methods for optimizing grammar structure for a set of phrases to be used in speech recognition during a computing event are provided. One method includes receiving a set of phrases, the set of phrases being relevant for the computing event and the set of phrases having a node and link structure. Also included is identifying redundant nodes by examining the node and link structures of each of the set of phrases so as to generate a single node for the redundant nodes. The method further includes examining the node and link structures to identify nodes that are capable of being vertically grouped and grouping the identified nodes to define vertical word groups. The method continues with fusing nodes of the set of phrases that are not vertically grouped into fused word groups. Wherein the vertical word groups and the fused word groups are linked to define an optimized grammar structure. In another aspect, a layered grammar and dictionary library that can be defined for efficient use in speech recognition systems, is provided.

18 Claims, 10 Drawing Sheets

| Reduction Step | Nodes | Links |
|---|---|---|
| Original word graph | 14 | 15 |
| Redundant node elimination | 12 | 13 |
| Node grouping | 11 | 11 |
| Node Fusion | 6 | 6 |
| Node grouping | 6 | 6 |

FIG. 5

STRUCTURE FOR GRAMMAR AND DICTIONARY REPRESENTATION IN VOICE RECOGNITION AND METHOD FOR SIMPLIFYING LINK AND NODE-GENERATED GRAMMARS

CLAIM OF PRIORITY

The present application claims priority from U.S. Provisional Application No. 60/683,221, filed on May 20, 2005, which is herein incorporated by reference.

BACKGROUND

1. Field of the Invention

The present invention relates generally to the method of speech recognition systems, and more particularly, to a method of using an efficient dictionary and grammar structures.

2. Description of the Related Art

In the field of speech recognition systems a speech recognition system inputs an audio stream that is filtered to extract and isolate sound segments that are speech. The speech recognition engine then analyzes the speech sound segments by comparing them to a defined pronunciation dictionary, grammar recognition network and an acoustic model.

Sublexical speech recognition systems are usually equipped with a way to compose words and sentences from more fundamental units. For example, in a speech recognition system based on phoneme models, pronunciation dictionaries can be used as look-up tables to build words from their phonetic transcriptions. A grammar recognition network can then interconnect the words. Due to their complexity grammar recognition networks are seldom represented as look-up tables and instead are usually represented by graphs. However, the grammar recognition network graphs can be complicated structures that are difficult to handle and represent. Although there is not a fixed standard for grammar recognition network graphical representations, a current structure used is the Hidden Markov Model Toolkit (HTK) Standard Lattice Format (SLF).

SLF can be used to represent multiple recognition hypotheses in a word lattice fashion and a grammar recognition network for speech recognition. This format is composed of various fields or parts. The most relevant ones are the node and link fields. Together both fields define the grammar graph. Each node represents one of the edges of the graph and each link is related to one of the graph arcs. The words in the grammar can be associated to either the nodes or the links. The links can be associated to N-gram likelihoods, word transition probabilities and acoustic probabilities.

In the context of efficient grammar graph representation, one disadvantage of SLF is its explicitness to list nodes and links. Fundamentally, when words are associated to the nodes, the SLF nodes are only able to represent one and only one word. By the same token, each link represents one and only one transition between nodes. This explicitness makes it difficult for a human reader to interpret the contents of the grammar and, more importantly, requires a large memory object to be handled by the speech recognition system.

Another disadvantage of SLF is its lack of association with other elements of the recognition system, particularly the pronunciation dictionary. The interaction between the grammar recognition network and the pronunciation dictionary is dependent on the specific implementation of the speech recognition process. However, as long as the grammar recognition network and pronunciation dictionary are separate entities there can be undesirable operation of the speech recognition system. For example, if there are errors in the pronunciation dictionary they are not visible from the grammar recognition network and vice versa. Furthermore, it can be difficult to have changes made in one reflected in the other.

In view of the forgoing, there is a need for a more efficient method that can represent a unified layered dictionary and grammar structure.

SUMMARY

In one embodiment, a method for optimizing grammar structure for a set of phrases to be used in speech recognition during a computing event is provided. The method includes receiving a set of phrases, the set of phrases being relevant for the computing event and the set of phrases having a node and link structure. Also included is identifying redundant nodes by examining the node and link structures of each of the set of phrases so as to generate a single node for the redundant nodes. The method further includes examining the node and link structures to identify nodes that are capable of being vertically grouped and grouping the identified nodes to define vertical word groups. The method continues with fusing nodes of the set of phrases that are not vertically grouped into fused word groups. Wherein the vertical word groups and the fused word groups are linked to define an optimized grammar structure.

In another embodiment, a method for operating a speech recognition system is provided. The method includes receiving voice input, an acoustic model and a layered grammar and dictionary library at the speech recognition engine. Included in the layered grammar and dictionary library is defining a language and non-grammar layer that supplies types of rules a grammar definition layer can use and defines non-grammar the speech recognition system should ignore and defining a dictionary layer that defines phonetic transcriptions for word groups the speech recognition system is meant to recognize when the voice input is received. Also included in the layered grammar and dictionary library is defining a grammar definition layer that applies rules from the language and non-grammar layer to define combinations of word groups the speech recognition system is meant to recognize when the voice input is received. The method concludes with using the acoustic model and the layered grammar and dictionary library to process the voice input.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 5 is a summary of the optimization in accordance with one embodiment of the present invention.

DETAILED DESCRIPTION

An invention is disclosed for generating an optimized grammar structure and using the optimized grammar structure for use in a unified layered grammar and dictionary library for speech recognition. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Because of their computational complexity speech recognition systems must balance the capacity to accurately identify speech with the available computing capacity of the system. Optimizing the grammar structure by grouping words together can improve the performance of the system by reducing the memory object the system must handle. Additionally, unifying the dictionary library and grammar definitions further optimizes the system because changes to either the dictionary or grammar definitions are immediately incorporated in the other component. Part I describes the process of optimizing a grammar structure by grouping words together. Part II describes how to use the optimized grammar structure as part of a unified layered grammar and dictionary library.

Part I: Optimizing Grammar by Grouping Words

Figure 1A:
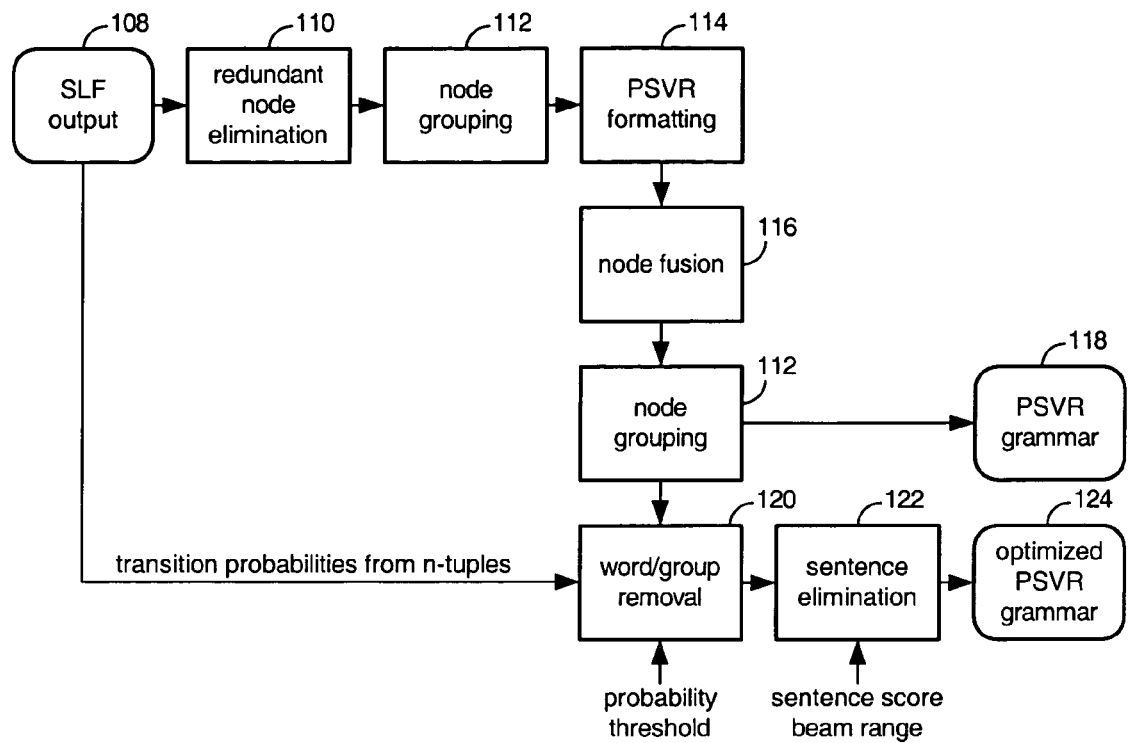
FIG. 1A is a flowchart of the process of creating a grammar structure, in accordance with one embodiment of the present invention.

FIG. 1A is a flowchart of the process of creating a grammar structure, in accordance with one embodiment of the present invention. In this embodiment SLF output 108 is simplified using redundant node elimination 110 as will be described in FIG. 2. Node grouping 112, as will be described in FIG. 3, is performed after the redundant node elimination 110 and, in this particular embodiment, results in Playstation Voice Recognition (PSVR) formatting 114. For the purposes of discussion, reference will be made to "PSVR", although other formatting systems may be used.

The next step is to carry out node fusion 116 on the PSVR formatted text. An example of the node fusion 116 is provided in FIG. 4 and the result is a grammar structure labeled PSVR grammar 118. As the diagram indicates, further simplification of the grammar structure can be achieved by applying the transition probabilities from n-tuples based on the SLF output to conduct word group removal 120 and sentence elimination 122. The results are an optimized grammar structure, which for this example is labeled Optimized PSVR grammar 124.

Figure 1B:
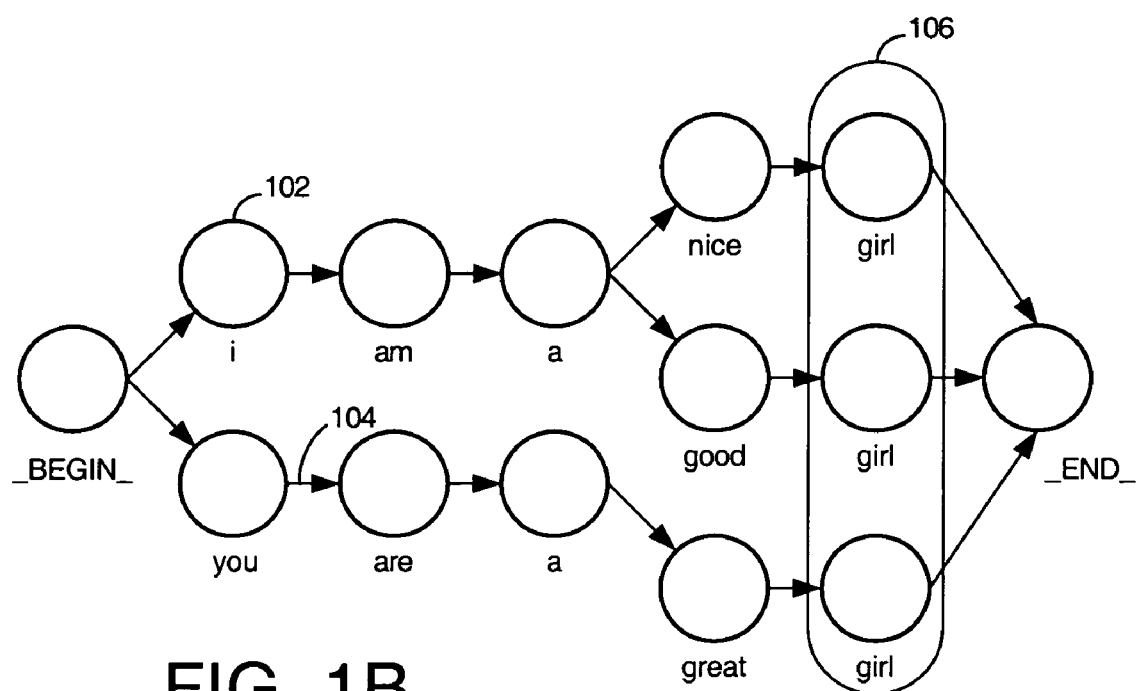
FIG. 1B is a grammar graph of a set of phrases in the form of a node and link structure generated from the input of three sentences, in accordance with one embodiment of the present invention.

FIG. 1B is a grammar graph of a set of phrases in the form of a node and link structure generated from the input of three sentences, in accordance with one embodiment of the present invention. As shown in FIG. 1B, the phrases "I am a nice girl.", "I am a good girl." and "You are a great girl." have been reduced to a node 102 and link 104 structure. Although the graph seems to contain redundant nodes 106, their presence guarantees that all the input phrases are supported in the grammar graph.

Inspection shows that the grammar graph is complete because it can only produce the three inputted phrases. Also notice that the grammar graph does not allow over-generation. Over-generation is when the grammar graph allows the generation of phrases other than those of the inputted phrases. Completeness and lack of over-generation are very appealing despite of the complexity of the grammar graph. One way to quantify the complexity of a grammar graph is to count the nodes 102 and the links 104. In the grammar graph shown in FIG. 1B there are 14 nodes 102 and 15 links 104.

Figure 2:
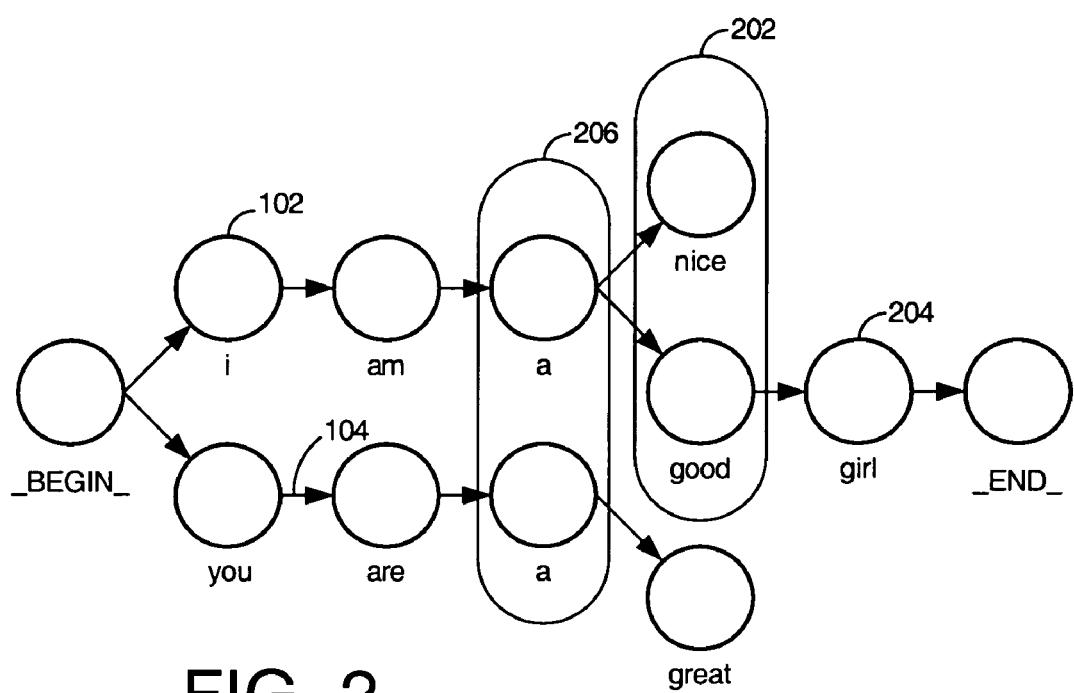
FIG. 2 is a grammar graph showing the results of redundant node elimination, in accordance with one embodiment of the present invention.
Figure 3:
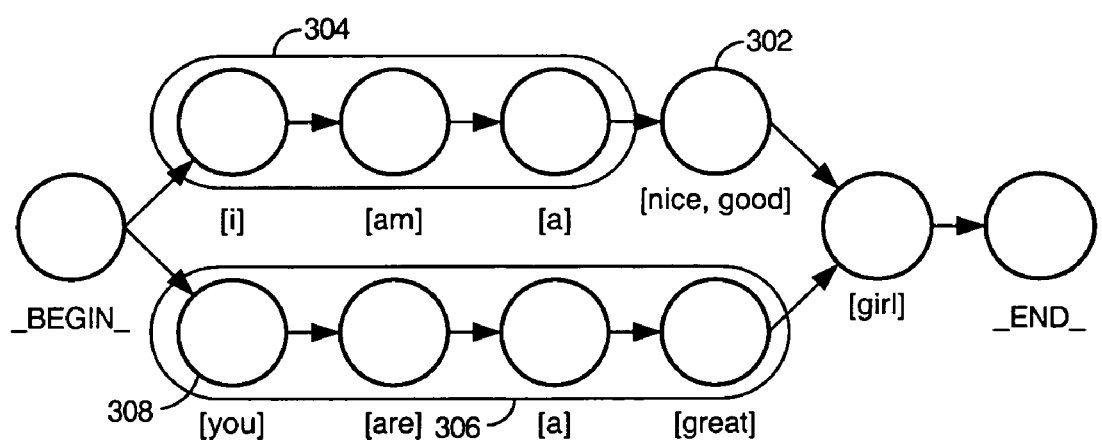
FIG. 3 is a grammar graph showing the result of grouping vertical nodes and converting individual words into word groups, in accordance with one embodiment of the present invention.

FIG. 2 is a grammar graph showing the results of the redundant node 106 elimination, in accordance with one embodiment of the present invention. In one embodiment redundant nodes are identified for elimination if the nodes represent the same word, the outgoing links of the potential redundant nodes all go to the same set of successor nodes and the potential redundant nodes do not appear as a begin node in more than one link. Based on the given definition of redundant nodes, the grammar graph can be traversed in order to find the redundant nodes and the remaining nodes reconnected to maintain the completeness of the graph while also not allowing over-generation. In this case, the redundant nodes 106 can be eliminated and replaced by node 204. Note that nodes 206, that represent the same word "a", cannot be eliminated because they do not comply with the definition of redundant nodes and their elimination would result in improper modeling of the input sentences. After the elimination of the redundant nodes, the grammar graph is composed of 12 nodes 102 and 13 links 104.

FIG. 3 is a grammar graph showing the result of grouping vertical nodes and converting individual words into word groups, in accordance with one embodiment of the present invention. It is possible to group words together in such a way that the nodes no longer represent individual words. Instead, the nodes represent a word group as shown in FIG. 3 by the brackets placed around the words. A word group may contain a single word as seen in word group 308 or multiple words as seen in word group 302. Node grouping can be based on the definition of interchangeable words in the grammar graph. In this example word groups within nodes are interchangeable in the grammar graph only if their set of successor and predecessor nodes are the same.

Referring to FIG. 2 and FIG. 3, grouping node cluster 202 results in the word group 302. Node grouping can be intuitively understood as an operation where the node cluster 202 has been merged in a vertical direction into the word group 302. After vertical node grouping and converting the words into word groups, the number of nodes and links in the grammar graph have both been reduced to 11.

Figure 4:
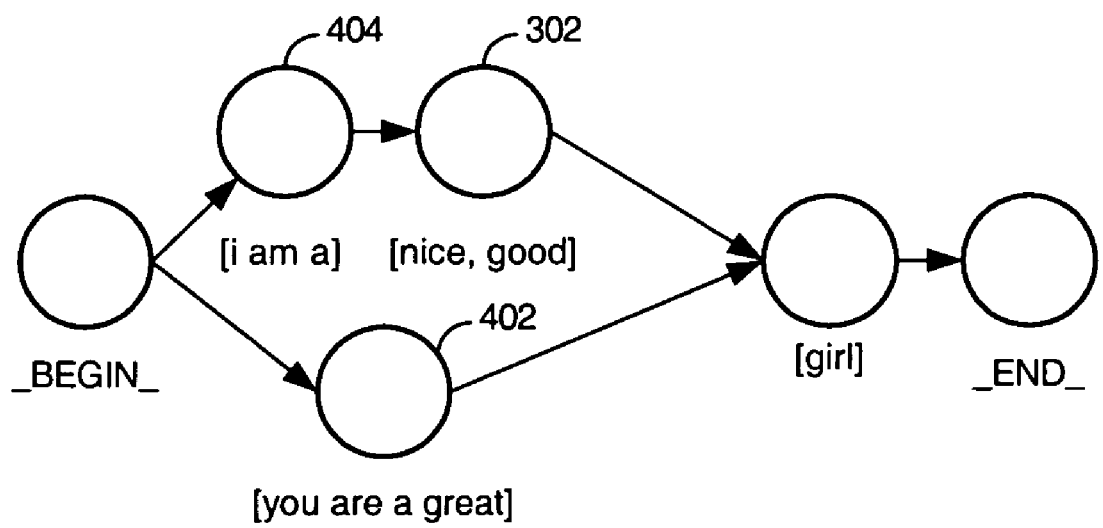
FIG. 4 is a grammar graph showing the result of fusing horizontal nodes, in accordance with one embodiment of the present invention.

FIG. 4 is a grammar graph showing the result of fusing horizontal nodes, in accordance with one embodiment of the present invention. Referring to FIG. 3, node cluster 304 is composed of word groups that each contain one word. Fusion of horizontal nodes can be applied to those word groups that comply with a series of conditions related to the fact that the combination of nodes represents a single sentence path across the grammar graph. For example, a node in a grammar graph can be fused with it's predecessor using the following conditions: if both nodes have only one word in their word group, the node has only one predecessor, the predecessor node is not predecessor to any other node, the END and BEGIN node do not merge, and the predecessor node has only one predecessor itself. Referring to FIG. 3, the node cluster 304, and node cluster 306 each form two uninterrupted strings of nodes that only include word groups each containing one word and that do not branch out of the main path. The internal transitions within these node clusters can be eliminated and the nodes and their words can be fused without affecting the completeness or allowing over-generation within the grammar graph. Referring to FIG. 4 and FIG. 3, the result of node fusion is that fused group 402 replaces the node cluster 306 and the fused group 404 replaces the node cluster 304.

Completing node fusion creates new multi-word word groups that may be susceptible to further simplification. Thus, the final step of the grammar graph reduction is to perform another node grouping targeting new multi-word word groups. For example, the new word groups are interchangeable in the grammar graph if their sets of successor and predecessor nodes are the same. The example used cannot benefit from a second node grouping however the second node grouping will further simplify the grammar graph in many situations.

FIG. 5 is a summary of the optimization in accordance with one embodiment of the present invention. Redundant word elimination combined with node grouping, node fusion and a second round of node grouping reduced the number of nodes in the original grammar graph from 14 to 6 and the number of links from 15 to 6. As will be shown, the reduced grammar structure can be incorporated into a grammar definitions layer and combined with a dictionary layer containing the phonetic transcriptions of the word groups and a language/non-grammar layer to comprise a unified layered grammar and dictionary library.

Note that the generation of the groups for a grammar structure could be accomplished by a computer or by a person. Automatically generating the word groups using a computer may result in a larger number of groups because of limitations in the software used to identify words as candidates for grouping or fusing. It may be possible for a person to construct a more compact and robust dictionary by applying their knowledge of a particular language to eliminate redundant nodes and find more efficient node fusions and node groupings.

Part II: Unified Layered Grammar and Dictionary Library

Figure 6:
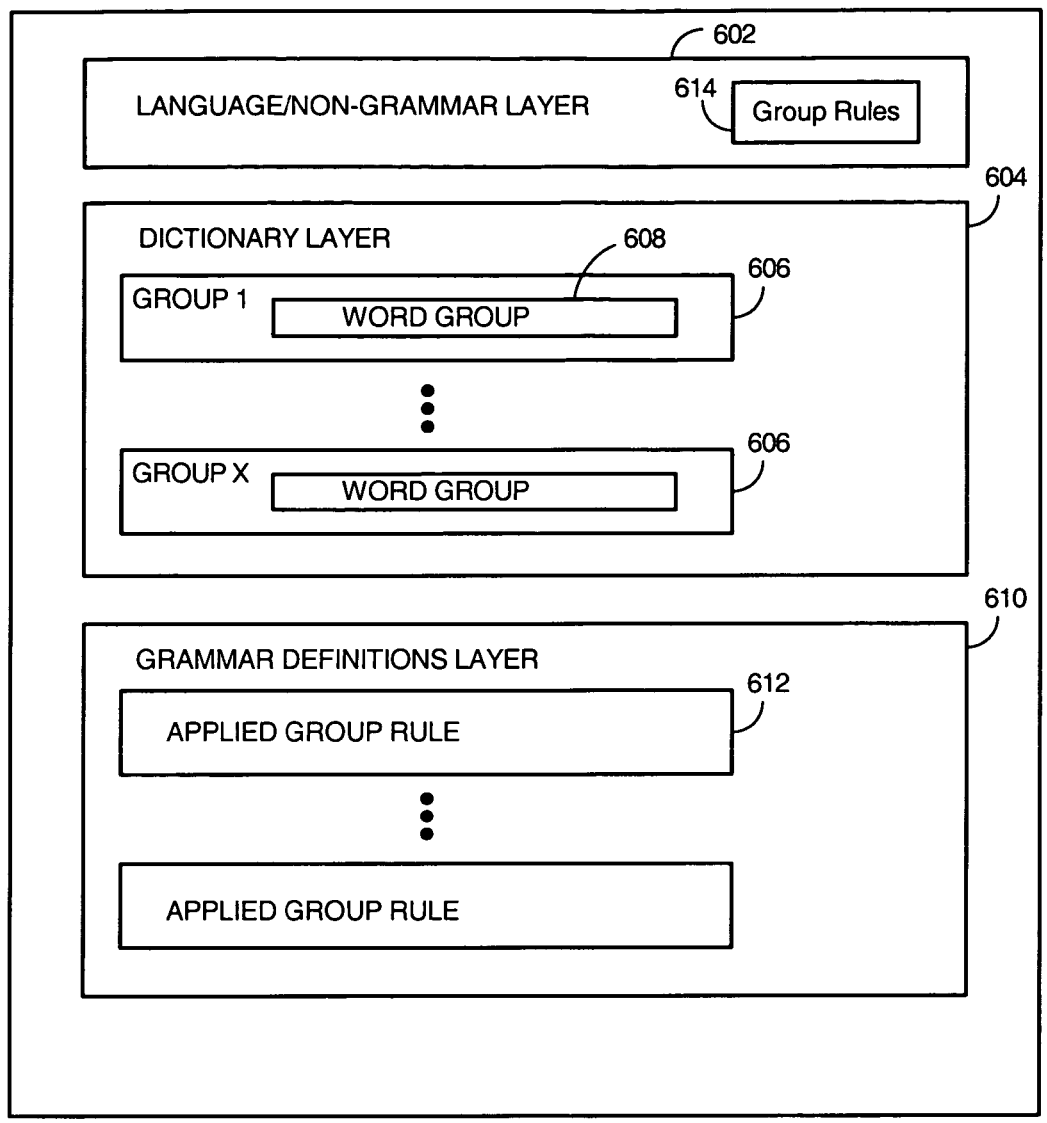
FIG. 6 is a representation of the layers in a layered grammar and dictionary library in accordance with one embodiment of the present invention.

FIG. 6 is a representation of the layers in a layered grammar and dictionary library in accordance with one embodiment of the present invention. In this embodiment there is a language/non-grammar layer 602, a dictionary layer 604, and a grammar definitions layer 610.

The language/non-grammar layer 602 can be viewed as an understanding layer. For example the language/non-grammar layer 602 can define a symbol or an abbreviation representing silence. By defining silence a programmer has the choice to require silence between words or to optionally allow silence between words. The language/non-grammar layer 602 also contains information that defines the language the system can recognize, along with garbage that is ignored by the voice recognition software. Garbage can be identified as silence and/or any continuous combination of user designated phonemes as shown below in Table B and Table C. A user can also define the minimum phoneme set for a particular language, specify N-gram probabilities and define word meaning grouping in the language/non-grammar layer 602. Of course, other types of non-grammar entities can be represented to make the system more efficient. The dictionary layer 604 contains groups 606 each containing a word group 608. The grammar definitions layer 610 applies a group rule 614 to groups 606 to define the words and phrases the system is meant to recognize. Applied group rule 612 represents the application of the group rule 614 to the groups 606.

In the following Table A, an example of syntax used to define the format of the contents of the layered grammar and dictionary library is provided. Note that Table A is an example and is merely one way to define the syntax notations and syntax of a layered grammar and dictionary library. Other syntax notations and syntax are possible and Table A is not meant to be restrictive.

TABLE A

Syntax Notation
Each line contains one entry. Lines are separated by a linefeed ("\n") oxr carriage return ("\r")

| | |
|---|---|
| !$BOLD word | Reserved keyword to type exactly as indicated, for example, !$LANGUAGE. |
| Italic word | A term, variable, or grouping to replace with appropriate text. |
| SPACE | Replace with any white-space character or characters, which includes tabs. Tabs and spaces are treated equally. The number of white-space characters in one place is not relevant except they are quoted as a token; you can use as many or few as needed to format the file. |
| TOKEN | An ASCII character string composed of one or more characters except \r, \n, \", \0, \;, or space. Avoid using character * because it makes it confusable with patterns in grammar-rule. |
| TOKEN_QUOTED | A quoted TOKEN has quotation marks (") at both ends of the string; white space and \; are allowed between the quotes. Quoted TOKEN is used only for word othography. |
| TOKEN_PHONE | An ASCII character string composed of one or more characters in the range of a–zA–Z0–9_ |
| ::= | Means "is defined as". |
| [ ] | Indicates an optional element. |
| [ ]+ | Zero or more repetitions of the content enclosed by the brackets. When it covers one complete line, it implies that the carriage return at the end of the line is repeated. For example, [this th i s]+ means that "this th i s" can be repeated on separate consecutive lines zero or more times. |

TABLE A-continued

| | | |
|---|---|---|
| * | | Any character except the asterisk ("*") or quotation mark (") is valid in this position. |
| \ | | When preceding [, ], or *, indicates that the character should be used exactly as is rather than being interpreted as above. |
| Other punctuation | | Within the GnD, special characters have the following meanings: |
| | \| | Choose one. |
| | ~ | Garbage phoneme. |
| | [ ] | Optional phoneme(s). |
| | ( ) | Groups of phonemes that are interchangeable for a single phoneme position in a pronunciation. |
| | / | A bigger, specific contex. For example, ae/bat means the phoneme ae of the word bat. |
| | _ _ _ | Optional silence. (3 underscores) |
| | * | Any one or more characters. |
| | "([\|/])+−" | Special characters used in phoneme names. |
| | phone1−phone2 | Phone2 with left context of phone1. E.g., aa−f |
| | phone1+phone2 | Phone1 with right context of phone2. E.g., f+aa |
| | ==> | Continuous grammar deduction. A ==> B means speaker is allowed to say A followed by B without a pause. |
| | --> | Paused grammar. A --> B means speaker can say B after A, but speaker must pause before saying B. |
| | pattern | Any quoted ASCII string, in which * stands for any one or more characters. It is used only in grammar-rule. Used to match word string or vocabulary string in the PSVR grammar-and-dictionary (GnD). |
| | ! | Beginning of the declaration of a variable or keyword. |

Syntax

```
GND ::=
    [;*]
    [!$LANGUAGE *] [;*]
    [!$PHONES *] [;*]
    [!$SILENCE sil] [;*]
    [[!$GARBAGE pronunciation] [;*]]
    [[~word pronunciation [;[feature]*]]]+
    [!$DICTIONARY_ALL [;*]
    [word pronunciation [;[feature]*]]+]
    [!$VOC [!$C=(0–9)] [!$TOKEN]+ [;*]
    [word [pronunciation [;[feature]*]]]+]+
    [!$SENTENCE [;*]
        grammar-rule [;*]
       [grammar-rule [;*]]+]
    [ngrams]
feature ::=
    [!$MEANING=*] [!$TOKEN]+
word ::=
    TOKEN
word ::=
    TOKEN_QUOTED
VOC ::=
    TOKEN
sil ::=
    TOKEN_PHONE
sil ::=
    \[TOKEN_PHONE\]
Note: default is [sil]
pronunciation ::=
    phone [phone]+ [;*]
phone ::=
    [_] TOKEN_PHONE [_]
phone ::=
    [_] \[TOKEN_PHONE [|TOKEN_PHONE]+\] [_]
  phone ::=
    [_] \(TOKEN_PHONE[|TOKEN_PHONE]+\) [_]
pattern ::=
    TOKEN
pattern ::=
    "[pattern]*[pattern]"
probability ::=
    number#
probability ::=
    [−\+][(0–9)]+.(0–9)[(0–9)]+[#]
```

TABLE A-continued

```
number ::=
    [-\+](1-9)[(0-9)]+
Note: The number is interpreted as log probability. Probability of -99.0 or smaller is
equivalent to log(0).
grammar-rule ::=
    SPACE --> $TOKEN [probability]
grammar-rule ::=
    SPACE ==> $TOKEN [probability]
grammar-rule ::=
    $TOKEN --> $TOKEN [probability]
grammar-rule ::=
    $TOKEN ==> $TOKEN [probability]
grammar-rule ::=
    pattern --> $TOKEN [probability]
grammar-rule ::=
    pattern ==> $TOKEN [probability]
ngrams ::=
    !$ ngram[/$VOC]
    [[probability] word [ word]+ [probability]]+
Note: First probability is the n-gram's probability. The number of n-grams depends
on the number of Words in the single line. The second probability is the back-off
probability.
Example: The phrases "John buys" and "John runs" are 2-grams (contain two
words). If the probability of the first 2-gram is 0.6 and of the second is 0.4, then when
PSVR has recognized "John" it knows that it is more likely for the next word to be
"buys" than "runs".
```

In the following Table B, an example of a layered grammar and dictionary library is provided where a manual grouping was generated based on specific phrases. Table C, also included below, represents a computer generated layered grammar and dictionary library for the same phrases represented in Table B. As discussed above, the manually generated Table B has word groups under grammatical structure headings derived from the users knowledge of the English language whereas the computer generated Table C groups are simply labeled as numbered groups. It should be understood that the English language is only used herein as an example, and any other spoken or coded language may also be used. The two tables illustrate how two different layered grammar and dictionary library structures can represent the same phrases.

TABLE B

```
{Manually-designed dictionary/grammar file}
;----------------------------------------------------------------
!$SILENCE            [sil]
!$GARBAGE            sil aa iy uw eh ax hh n d s
;----------------------------------------------------------------
!$SUBJECT !$SINGULAR
"You"                y uw
"I"                  ay
;----------------------------------------------------------------
!$SUBJECT !$PLURAL
"We"                 w iy
;----------------------------------------------------------------
!$VERB !$SPECIAL_VERB
"Rock and roll"      r aa k _ _ _ ax n _ _ _ r ax l
;----------------------------------------------------------------
!$VERB !$COMPOSE
"Have fun"           hh ae v _ _ _ f ah n
"Look good"          uh k _ _ _ g uh d
"Love to"            l ah v _ _ _ t uw
"Like to"            l ay k _ _ _ t uw
"Enjoy"              eh n jh oy
;----------------------------------------------------------------
!$OBJECT
;----------------------------------------------------------------
"Dress up"           d r eh s _ _ _ ah p
"Dress up"           d r ix s _ _ _ ah p
```

TABLE B-continued

```
"Talk"               t aa k
"Swim"               s w ih m
"Swim"               s w ix m
"Play"               p l ey
;----------------------------------------------------------------
!$ENJOY_OBJECT
;----------------------------------------------------------------
"Dancing"            d ae n s ix ng
"Music"              m y uw z ix k
;----------------------------------------------------------------
!$SENTENCE
;----------------------------------------------------------------
                     ==> $SUBJECT
"$SUBJECT"           ==> $VERB
"* to"               ==> $OBJECT
"Enjoy"              ==> $ENJOY_OBJECT
```

TABLE C

```
{Auto-generated dictionary/grammar file}
;----------------------------------------------------------------
!$SILENCE            [sil]
!$GARBAGE            sil aa iy uw eh ax hh n d s
;----------------------------------------------------------------
!$group_2
;----------------------------------------------------------------
"I"                  ay
"You"                y uw
"We"                 w iy
;----------------------------------------------------------------
!$group_7
;----------------------------------------------------------------
"Play"               p l ey
"Talk"               t aa k
"Dress up"           d r eh s _ _ _ ah p
"Dress up"           d r ix s _ _ _ ah p
"Swim"               s w ih m
"Swim"               s w ix m;
----------------------------------------------------------------
!$group_10
;----------------------------------------------------------------
"Dancing"            d ae n s ix ng
"Music"              m y uw z ix k
;----------------------------------------------------------------
```

TABLE C-continued

```
!$group_13
;------------------------------------------------------------
"to"                    t uw;
;------------------------------------------------------------
!$group_14
;------------------------------------------------------------
"Enjoy"                 eh n jh oy
;------------------------------------------------------------
!$group_16
;------------------------------------------------------------
"Like"                  l ay k
"Love"                  l ah v
;------------------------------------------------------------
!$group_5
;------------------------------------------------------------
"Rock and roll"         r aa k _ _ _ ax n _ _ _ _ r ax l
"Look good"             l uh k _ _ _ _ g uh d
"Have fun"              hh ae v _ _ _ _ f ah n
;------------------------------------------------------------
;------------------------------------------------------------
!$SENTENCE
;------------------------------------------------------------
                        ==> $group_2
"$group_13"             $group_7
"$group_14"             ==> $group_10
"$group_16"             ==> $group_13
"$group_2"              ==> $group_14
"$group_2"              ==> $group_16
```

Figure 7A:
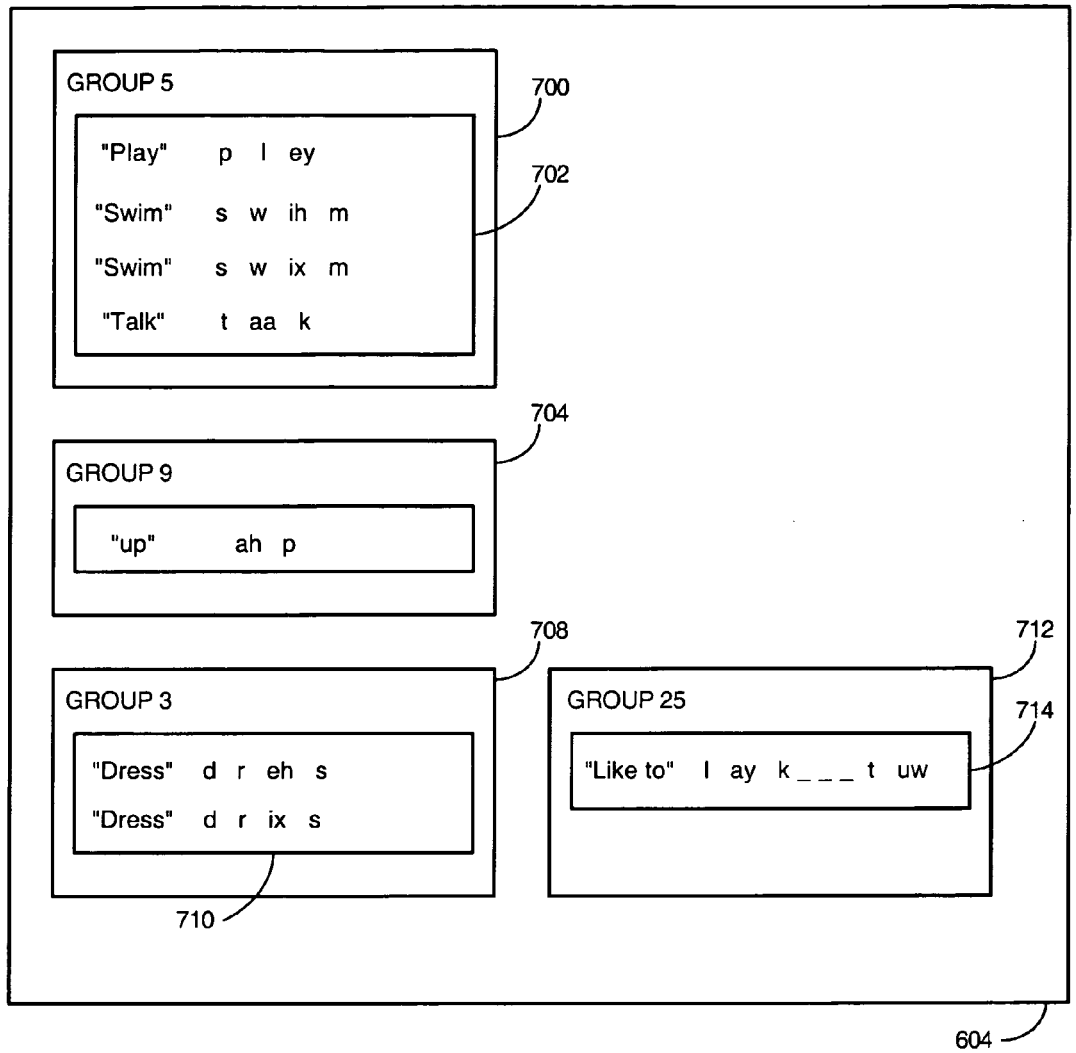
FIG. 7A is an example of the contents of the dictionary layer in accordance with one embodiment of the present invention.

FIG. 7A is an example of the contents of the dictionary layer 604 in accordance with one embodiment of the present invention. In this example the dictionary layer 604 is composed of the group 700, the group 704, the group 708 and the group 712. Respectively, the groups are composed of word group 702, word group 706, word group 710 and word group 714. Word groups are made up of at least one word and that word's phonetic transcriptions. In this example, the group 704 contains the word group 706 that is one word, "up" and the phonetic transcription "ah p". In this example a particular phoneme set, that might be different from language to language, was defined earlier in the process so "ah p" is meaningful to the voice recognition system along with the particular notation "_ _ _" which, as described in Table A, represents optional intra-word silence.

It is possible for a group to contain multi-word phrases as shown in the group 712. It is also possible that a group contain the same word with multiple phonetic transcriptions as shown in the group 708. Another example is a group with multiple words that also includes multiple phonetic transcriptions of one word as shown in the group 700. The above listing of single and multi-word phrases, multiple phonetic transcriptions and multiple word groups are provided as examples and should not be considered inclusive of all potential groupings. It should also be noted that the phonetic transcriptions shown in FIG. 7 are representative for this example and it is possible to use other phonetic transcriptions and combinations thereof to create a dictionary library.

Figure 7B:
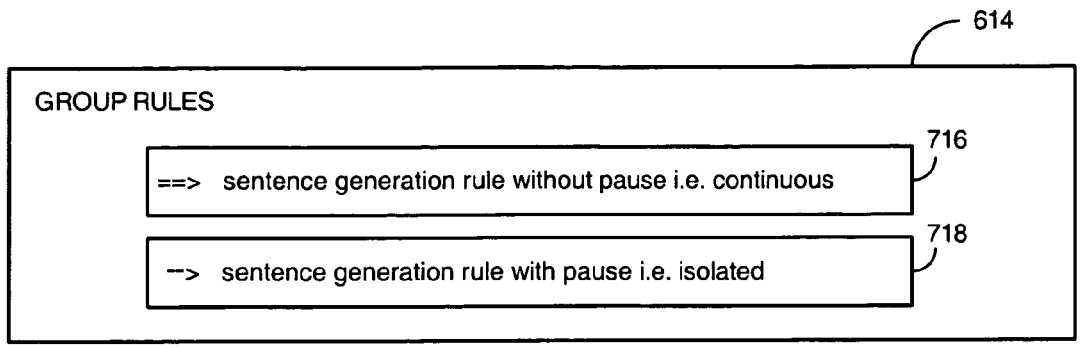
FIG. 7B is an example of group rules that can be defined in the language/non-grammar layer in accordance with one embodiment of the present invention.

FIG. 7B is an example of group rules 614 that can be defined in the language/non-grammar layer 602 in accordance with one embodiment of the present invention. In this example the group rule 716, represented by the characters "==>" requires that the word groups combined by the group rule occur continuously without pauses. In another example, the group rule 718, represented by the characters "-->" allows pauses between the combined word groups. Though the two example group rules both deal with pauses it is possible that new group rules could utilize specific sounds or sound sequences in order to link groups. The variety of possible group rules is unlimited.

Figure 7C:
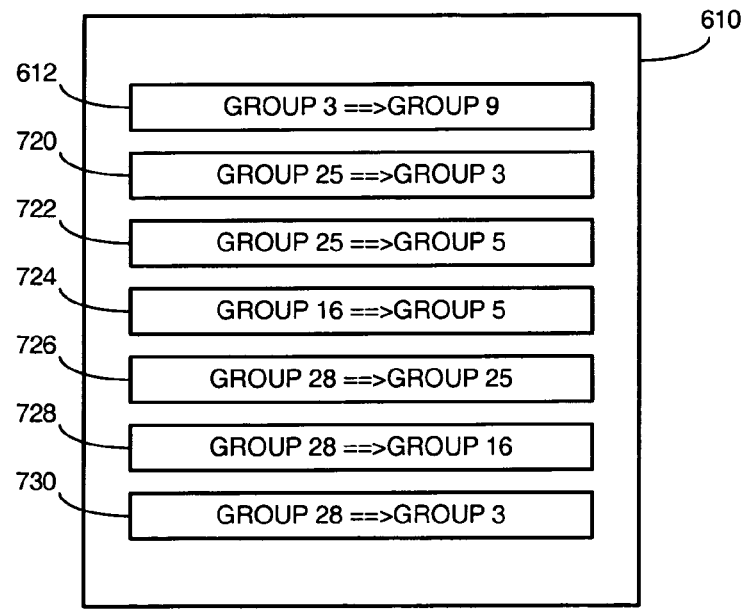
FIG. 7C is an example of how group rules become applied group rules in accordance with one embodiment of the present invention.

FIG. 7C is an example of how group rules 614 become applied group rules 612 in accordance with one embodiment of the present invention. In this example all the groups listed are joined by the group rule 716 meaning the groups cannot be separated by pauses. As mentioned above it would be possible to use a variety of group rules thus allowing combinations of words while restricting others.

Referring to the previously presented Table A and Table B under the sections designated "!$SENTENCE", note the more compact structure found in Table A. This compact structure is enabled because the word groups are based on grammatical structures. The use of the "*" wildcard in combination with the word "to" allows the connection of words such as "like to" and "love to" with just one line. Table A also demonstrates the use of "super groups". Under the heading "!$SENTENCE", $SUBJECT and $VERB are super groups. $SUBJECT is a super group composed of the groups $SUBJECT $ SINGULAR and $SUBJECT $PLURAR. Likewise, $VERB is a super group that includes $VERB $SPECIAL_VERB AND $VERB $COMPOSE. The use of the super group notation and sub-categorization based on grammatical structure allows a more compact representation of an otherwise complex grammar.

Figure 8:
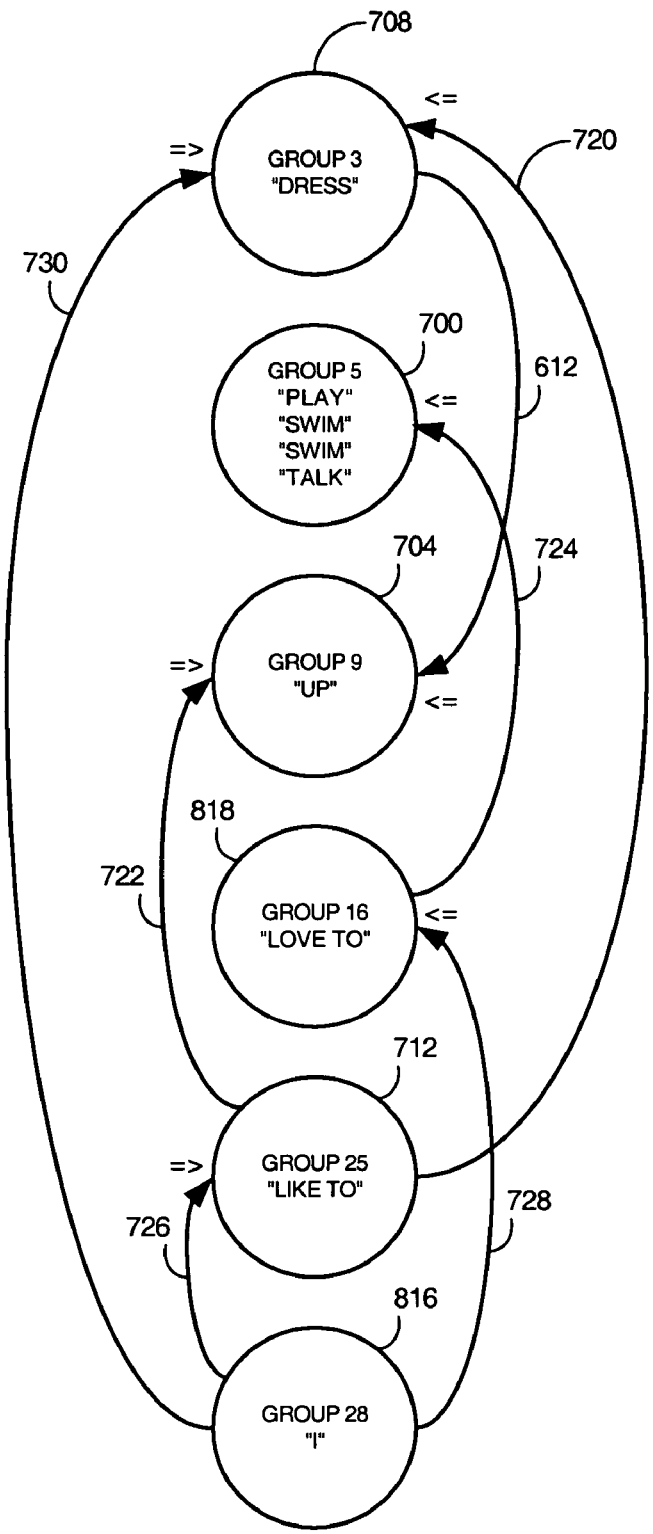
FIG. 8 is a diagram showing how different groups can be combined using the applied group rules from the grammar definitions layer to create phrases in accordance with one embodiment of the present invention.

FIG. 8 is a diagram showing how different groups can be combined using the applied group rules from the grammar definitions layer 610 to create phrases in accordance with one embodiment of the present invention. For example, following the path of applied group rule 726 results in connecting group 816 with the group 712 and results in the phrase "I like to". Because the group 712 can also be connected to the group 700 via applied group rule 722 or the combination of the group 708 and the group 704 via applied group rules 720 and 612, a plurality of phrases can be generated including, "I like to play.", "I like to dress up.", and "I like to swim."

It should be noted that the groups used in the example for FIG. 8 could benefit from further optimization. This is evident because the group 708 and the group 704 can be combined to create one group representing "dress up". With the change the totality of phrases generated by the groups in FIG. 8 remain unchanged. However, the reduction in complexity of the library could further enhance the system's ability to either recognize more phrases or run more efficiently. Also note that the group 816 cannot be combined with the group 712 or the group 818. While combining the group would simplify the library it would also eliminate the phrase "I dress up" formed by the combination of the applied group rules 730 and 612.

The benefits for changes in either the grammar dictionary layer 610 or the dictionary layer 604 to be reflected in the other should become clear after the following examples. Adding a word and the corresponding phonetic transcription into a word group within the dictionary layer 604 automatically results in a new combination of phrases. For example, adding the phase "like a clown" to the group 704 means the phrases "I dress like a clown" and "I like to dress like a clown" will be automatically recognized by the system without editing the grammar definitions layer. Accordingly, the addition of an applied group rule such as "Group 28==>Group 5" means the phrases "I play", "I swim" and "I talk" will be recognized by the system without modifying the dictionary layer 604.

Another benefit of a speech recognition system using a unified layered grammar and dictionary library system is a reduced memory footprint compared to that of a traditional system intended to recognize the same phrases. The reduced memory footprint allows speech recognition in systems where it was previously not possible or undesirable because of the strain it would place on computing resources.

Video game systems are an ideal candidate to benefit from a speech recognition system using a unified layered grammar and library system because speech recognition could enhance the interactivity and realism of video games. Video games are usually controlled via hand-operated devices using a combination of buttons and joysticks or a keyboard and mouse. Input from buttons and joysticks is relevant to computing events within games such as selecting objects for a game character to use or to control movement within the game. Correlating a set of relevant phrases to computing events within games such as "use flashlight," "use key," and "crawl" are well within the ability of a speech recognition system utilizing a unified layered grammar and dictionary library. Because specific game controls and commands could be inputted verbally using speech recognition the traditional input devices could be used to further enhance the interactivity of the game. The examples previously listed are all computer triggered voice gaming commands but it should be noted that speech recognition of relevant phrases related to a computing event for computer assisted voice communications, computer voice assisted gaming and computer triggered voice commands are all possible using a unified layered grammar and dictionary library.

Speech recognition could also enhance the realism of video games by allowing users to actively "speak" to characters within the game rather than selecting predetermined text phrases or typing dialog to initiate a particular computing event. Phrases such as "go away" or "leave me alone" could be spoken to prompt in game characters to walk away from the game player's character. Games allowing multiplayer interaction using the internet or an intranet could also benefit from speech recognition software by enhancing communication between players by. For example, if two players' characters meet in an online game environment player 1 can speak specific phrases that are recognized by the system and the corresponding text can appear at the second players remote location.

The complexity and number of phrases a unified layered grammar and dictionary library can recognize are constrained by the computing resources available to the speech recognition system. It would be possible for each game to have a custom dictionary and grammar library depending on the commands and actions necessary for the game. This would be advantageous because it would allow a programmer to balance the need to recognize specific phrases with particular meaning to the game with the available computing resources. To streamline development it would also be possible for game programmers to create a generic dictionary and library and add customized phrases for a specific game. While such a solution might simplify game development, maintaining a generic dictionary and library could sacrifice the number of customized phrases the speech recognition system could recognize.

Video game systems are not the only technology that could benefit from the compact, robust voice recognition systems enabled by a unified layered grammar and dictionary library. Handicapped people who have lost the ability to manipulate their limbs while maintaining the ability to speak could benefit greatly from systems using speech recognition. The reduced computing resources required by using a unified layered grammar and dictionary library could make such systems more portable thereby providing their users more freedom and interaction with society.

The groups and corresponding word groups along with the phrases generated in FIG. 8 and the subsequent discussion are only for exemplary purposes. It should be clear to one skilled in the art that unlimited sets of phrases for an unlimited number of applications related to computing events can be broken down into groups and entered into a similarly unified layered grammar and dictionary library. The available computing resource of the system is the only constraint on the number of relevant phrases recognized for any particular application.

Further optimization of a unified layered grammar and dictionary library is possible by using transition probabilities from n-tuples from the original SLF output. In one example transition probabilities can be used in the grammar definition layer 610 and word probabilities can be used within the dictionary layer 604. Using these probabilities it would be possible to eliminate unlikely or partial sentences from the grammar definitions layer 610 and rare words can be eliminated from the dictionary layer 604.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for optimizing grammar structure for a set of phrases to be used in speech recognition during a computing event, comprising:
    (a) receiving the set of phrases, the set of phrases being relevant for the computing event;
    (a1) defining each of the set of phrases in a node and link structure, wherein a given node is defined by one or more words, and wherein a given link connects the one or more words of one node to the one or more words of another node;
    (b) identifying redundant nodes by examining the node and link structures of each of the set of phrases so as to generate and substitute a single node for the redundant nodes, wherein redundant nodes are defined by identical words, and wherein each of the redundant nodes has a respective outgoing link to a same successor node;
    (c) examining the node and link structures to identify nodes that are capable of being vertically grouped and grouping the identified nodes to define vertical word groups; and
    (d) fusing horizontally linked nodes of the set of phrases that are not vertically grouped and that represent a single sentence path into fused word groups,
    wherein the vertical word groups and the fused word groups are linked to define an optimized grammar structure.

2. A method for optimizing grammar structure for a set of phrases to be used in speech recognition during a computing event as recited in claim 1, wherein the computing event includes computer assisted voice communication, computer triggered voice gaming commands, computer voice assisted gaming, and computer triggered voice commands.

3. A method for optimizing grammar structure for a set of phrases to be used in speech recognition during a computing event as recited in claim 1, wherein the set of phrases includes two or more spoken or written words, or groups of words.

4. A method for optimizing grammar structure for a set of phrases to be used in speech recognition during a computing event as recited in claim 1, wherein the node and link structure of the set of phrases includes a single node or multiple nodes connected by a directional link that indicates a progression of the nodes of a particular one of the set of phrases.

5. A method for optimizing grammar structure for a set of phrases to be used in speech recognition during a computing event as recited in claim 1, wherein a plurality of nodes are capable of being vertically grouped when each of the plurality of nodes is linked to both a same predecessor and a same successor node.

6. A method for optimizing grammar structure for a set of phrases to be used in speech recognition during a computing event as recited in claim 1, wherein fusing horizontally linked nodes includes generating and substituting a single multi-word node for the fused horizontally linked nodes.

7. A method for optimizing grammar structure for a set of phrases to be used in speech recognition during a computing event as recited in claim 1, wherein the optimized grammar structure is defined by a set of nodes that commence at a begin node and terminate at an end node, and the begin node is linked through the optimized grammar structure to the end node.

8. A method for optimizing grammar structure for a set of phrases to be used in speech recognition during a computing event as recited in claim 7, wherein the optimized grammar structure is constrained to only produce the phrases defined by the received set of phrases.

9. A method for optimizing grammar structure for a set of phrases to be used in speech recognition during a computing event as recited in claim 6, wherein a first node is fused with a second node when,
    the first node is horizontally linked to the second node,
    each of the first and second nodes has a respective word count of one,
    the first node is the only predecessor node to which the second node is horizontally linked,
    the second node is the only successor node to which the first node is horizontally linked, and
    the first node has only one predecessor node horizontally linked to itself.

10. A method for optimizing grammar structure for a set of phrases to be used in speech recognition during a computing event as recited in claim 1, wherein different sets of phrases for different computing events are processed by operations (a)-(d) to generate another optimized grammar structure for the different computing event.

11. A method for optimizing grammar structure for a set of phrases to be used in speech recognition during a computing event as recited in claim 1, wherein the grammar structure is further optimized by removing word groups based on transition probabilities from n-tuples.

12. A method for optimizing grammar structure for a set of phrases to be used in speech recognition during a computing event as recited in claim 1, wherein the grammar structure is further optimized by removing sentences based on transition probabilities from n-tuples.

13. A method for optimizing grammar structure for a set of phrases to be used in speech recognition during a computing event as recited in claim 1, wherein an additional step (e) examining the node and link structures to identify nodes that are capable of being vertically grouped and grouping the identified nodes to define vertical word groups; is added after the step (d).

14. A data storage device for storing data to be read by a computer system including program instructions for optimizing grammar structure for a set of phrases to be used in speech recognition during a computing event, comprising:
    (a) program instructions for receiving the set of phrases, the set of phrases being relevant for the computing event;
    (a1) program instructions for defining each of the set of phrases in a node and link structure, wherein a given node is defined by one or more words, and wherein a given link connects the one or more words of one node to the one or more words of another node;
    (b) program instructions for identifying redundant nodes by examining the node and link structures of each of the set of phrases so as to generate and substitute a single node for the redundant nodes, wherein redundant nodes are defined by identical words, and wherein each of the redundant nodes has a respective outgoing link to a same successor node;
    (c) program instructions for examining the node and link structures to identify nodes that are capable of being vertically grouped and grouping the identified nodes to define vertical word groups; and
    (d) program instructions for fusing horizontally linked nodes of the set of phrases that are not vertically grouped and that represent a single sentence path into fused word groups,
    wherein the vertical word groups and the fused word groups are linked to define an optimized grammar structure.

15. A data storage device for storing data to be read by a computer system including program instructions as recited in claim 14, wherein the computing event includes computer assisted voice communication, computer triggered voice gaming commands, computer voice assisted gaming, and computer triggered voice commands.

16. A data storage device for storing data to be read by a computer system including program instructions as recited in claim 14, wherein a plurality of nodes are capable of being vertically grouped when each of the plurality of nodes is linked to both a same predecessor and a same successor node.

17. A data storage device for storing data to be read by a computer system including program instructions as recited in claim 14, wherein fusing horizontally linked nodes includes generating and substituting a single multi-word node for the fused horizontally linked nodes.

18. A data storage device for storing data to be read by a computer system including program instructions as recited in claim 17, wherein a first node is fused with a second node when,
- the first node is horizontally linked to the second node,
- each of the first and second nodes has a respective word count of one,
- the first node is the only predecessor node to which the second node is horizontally linked,
- the second node is the only successor node to which the first node is horizontally linked, and
- the first node has only one predecessor node horizontally linked to itself.

* * * * *